United States Patent [19]

Swartzel et al.

[11] Patent Number: 4,957,760

[45] Date of Patent: Sep. 18, 1990

[54] ULTRAPASTEURIZATION OF LIQUID WHOLE EGG PRODUCTS WITH DIRECT HEAT

[75] Inventors: Kenneth R. Swartzel, Raleigh; Hershell R. Ball, Jr., New Hill; Jeffery W. Liebrecht, Raleigh, all of N.C.

[73] Assignee: North Carolina State University, Raleigh, N.C.

[21] Appl. No.: 312,066

[22] Filed: Feb. 16, 1989

[51] Int. Cl.$^5$ ...................... A23B 5/005; B65B 55/00
[52] U.S. Cl. ................................... 426/399; 426/511; 426/521; 426/614
[58] Field of Search ................. 426/399, 511, 521, 614

[56] References Cited

U.S. PATENT DOCUMENTS

| | | | |
|---|---|---|---|
| 2,565,311 | 8/1951 | Koonz et al. | 426/521 |
| 3,113,872 | 12/1963 | Jones et al. | 426/511 |
| 3,404,008 | 10/1968 | Ballas et al. | 426/521 |
| 3,579,631 | 5/1971 | Stewart et al. | 424/86 |
| 4,675,202 | 6/1987 | Wenger et al. | 426/614 |
| 4,808,425 | 2/1989 | Swartzel et al. | 426/399 |

OTHER PUBLICATIONS

T. F. Sugihara et al, Heat Pasteurization of Liquid Whole Egg, 1966, Food Technology, 20(1), pp. 100–107.
M. H. Mamis-Samani, K. R., Swartzel, and H. R. Ball, Jr., Aseptic Packaging of Ultra Pasturized Egg, Design and Economic Considerations (1985).
Leo Kline, T. F. Sugihara, Maura L. Bean, and K. Ijichi, *Food Technology*, 19, 105 (Nov. 1965).
Egg Pasteurization Manual ARS74–48, Mar. 1969, U.S. Dept. of Agriculture, Agriculture Research Service.
7 CFR, Part 59 (1985).
*Poultry Sci.*, 61, 1461–1462 (1982) (Abstract).
W. K. Stone and P. R. Rony, Aseptic Processing of Liquid Eggs Pasteurized in a Teflon Heat Exchanger (1983), and Letter from W. K. Stone dated Apr. 20, 1983.
E. O. Essary, P. R. Rony and W. F. Collins, New Uses of Heated Aseptically Packaged Fluid Egg Products.
Laura C. Jacobs, Aseptic Packaging Promises New Role for Pasteurized Liquid Eggs.
Personal Notes dated 10-31-83.
M. H. Hamid-Samimi and K. R. Swartzel, *J. of Food Proc. and Pres.*, 8, 219 (1984).
Kenneth R. Swartzel, *J. of Agri. and Food Chem.*, 34, 396 (May/Jun. 1986).
Abstract Concerning Poultry Science Association Annual Meeting, Jul. 29–Aug. 2, 1985, Iowa State University, Ames.
Mohammad-Hossein Hamid-Samimi, Thesis: Criteria Developement for Extended Shelf-Life Pasteurized Liquid Whole Egg (1984).

*Primary Examiner*—Marianne Cintins
*Assistant Examiner*—Evan Federman
*Attorney, Agent, or Firm*—Bell, Seltzer, Park & Gibson

[57] ABSTRACT

A method of continuously ultrapasteurizing liquid whole egg products is disclosed. The method provides improved run times and product viscosity control. In an embodiment of the method, the product is heated by contacting the product to a heated surface, heated by contacting the product to steam, held at the temperature to which it has been heated for a time sufficient to produce a nine log cycle reduction in *Listeria monocytogenes* therein, homogenized, cooled and aseptically packaged.

18 Claims, 2 Drawing Sheets

ULTRAPASTEURIZATION OF LIQUID WHOLE EGG PRODUCTS WITH DIRECT HEAT

FIELD OF THE INVENTION

The present invention relates to the pasteurization of liquid whole egg products, and particularly concerns methods for ultrapasteurizing liquid whole egg products in which the product is heated in two steps, the second step being a direct heating step.

BACKGROUND OF THE INVENTION

Large quantities of liquid egg products are pasteurized each year to produce products sold in refrigerated form with limited shelf life. See qenerally. *Egg Pasteurization Manual* (USDA Agricultural Research Service 1969). More recently, the provision of techniques for ultrapasteurizing liquid egg products has led to considerable interest in marketing liquid egg products which have extended shelf lives under refrigerated conditions.

M. Hamid-Samimi et al., in *IUFOST Symposium on Aseptic Processing & Packaging of Foods Proceedings.* 229 (Symposium held September 9–12, 1985, in Tylosand, Sweden), concerns ultrapasteurizing liquid egg in which the egg is heated by contacting to a heated surface. See also U.S. Patent Application Serial No. 904,744, filed Sep. 8, 1986. A problem with this technology is the tendency of the heated surface to eventually foul.

U.S. Pat. No. 3,113,872 to Eynon Jones discloses a method of treating liquid egg products (shown schematically in FIG. 2 therein) which employs (a) a first heating step in which liquid egg is contacted to a heated surface, (b) a first vacuum evaporation and cooling step, (c) a second heating step in which liquid egg is contacted to steam, and (d) a second vacuum evaporation and cooling step. In the first heating step, the egg is heated to a temperature between 140° and 144° F. (Col. 9; lines 6–13). Between the first heating step and the first vacuum step, the egg is held for about 30 seconds at a temperature of about 143° F. (Col. 9; lines 14–18). In the first vacuum step, liquid is held in a vacuum tank for three minutes and leaves the tank at a temperature of not less than 140° F. (Col. 9; lines 34–56). In the second heating step, the egg is delivered to a steam infusion chamber where it is heated to a temperature of between 155° and 165° F. for about one second (Col. 10; lines 27–31 and 72–75). This second heating step is carried out under a vacuum (Col. 10; lines 18–21), with the egg being drawn by vacuum from the steam infusion chamber to the second vacuum chamber for the second vacuum step (Col. 10; lines 21–27). In the second vacuum step, the egg is held for about six seconds and cooled to 140° F., and then removed for further cooling (Col. 11; lines 3–8 and 16–40). T. Sugihara et al., *Food Technology* 20, 1 (1966) discloses a method of treating liquid whole egg (shown schematically in FIG. 1 on page 4 thereof) which employs (a) a first heating step in which liquid egg is contacted to a heated surface, (b) a second heating step in which the liquid egg is contacted to steam, and (c) a vacuum evaporation and cooling step. In the first heating step, egg is heated to between 134° and 149° F. (Page 2, Col. 3). The egg is held for a time between 1 to 3½ minutes, with a temperature drop generally not greater than 1° F., between the first and second heating step. In the second heating step, the egg is heated by steam under vacuum to a temperature between 150° and 170° F. The egg is then drawn by vacuum into a vacuum chamber, where it is flash-cooled to about 127° F. (Page 2, Col. 3 –Page 3, Col. 1).

Sugihara et al., at Page 4, Column 3 thereof, note that water gain in the treated egg from steam condensation during the steam heating step is offset by water loss during the vacuum cooling step. Thus, their process apparently did not appreciably affect the solids content of the treated egg. However, these authors go on to acknowledge that the loss of $CO_2$ from the egg during vacuum cooling usually increased the pH of the egg from about 7.4 to about 7.8 to 7.9. Raising the pH of egg disadvantageously affects the sulfur chemistry of the egg, and can cause the egg to turn green in color.

L. Kline et al., *Food Technology*, 105 (Nov. 1965), at page 114, report a method of processing liquid egg white similar to the method of processing liquid whole egg disclosed by Sugihara et al., supra. A problem with Kline et al., Sugihara et al., and Eynon Jones is the difficulty of regulating a process in which the egg product is withdrawn from the bottom of a steam infusion chamber by vacuum after only a few seconds therein.

SUMMARY OF THE INVENTION

An object of this invention is to provide a method of ultrapasteurizing liquid egg products characterized by decreased fouling of heated surfaces therein and extended run times. An additional object of this invention is to provide a method of ultrapasteurizing liquid egg products in which the viscosity of the product produced is controlled. A further object of this invention is to provide methods of continuously ultrapasteurizing liquid egg products which are relatively simple to regulate.

Disclosed herein is a method of ultrapasteurizing a liquid whole egg product, while passing the product as a continuous product stream through a pasteurizing apparatus. In this method, the product is initially heated to a first predetermined temperature in a first heating step (preferably an indirect heating step). The product is then maintained at the first predetermined temperature for a first predetermined holding time. Next, the product is heated to a second predetermined temperature in a direct heating step (preferably by contacting the product to steam). The product is then maintained at the second predetermined temperature for a second predetermined holding time sufficient to cause the desired bacterial kill in the product. The product is then cooled and aseptically packaged to provide a packaged liquid whole egg product preferably having a shelf life of at least four weeks under refrigerated conditions. The term "refrigerated," as used herein, means maintained at a temperature of 4° Centigrade.

To obtain a satisfactory refrigerated shelf life product, it is preferred that the pasteurizing apparatus be sterilized before the product is passed therethrough.

In one embodiment of the invention, the product is cooled without the use of a vacuum chamber. That is, the product is maintained at not less than atmospheric pressure from the time the product is heated to the second predetermined holding temperature to the time the product is packaged. Elimination of the vacuum chamber substantially simplifies operation of the process.

In a second embodiment of the invention, the product is heated by steam injection in the direct heating step. That is, the product is heated by injecting steam under pressure into the continuous stream of product under conditions which cause the injected steam to condense. While steam injection is used to sterilize milk, insofar as these applicants are aware, steam injection has not heretofore been used for pasteurizing a liquid whole egg product. Instead, steam injection has been used to scramble egg and has been used to sterilize dilute solutions containing egg and dilute egg yolk solutions. See U.S. Pat. Nos. 3,579,631 to Stewart et al. and 4,675,202 to Wenger et al. A steam injection step is, however, substantially easier to control in the present process than the alternate process step of steam infusion.

In a preferred embodiment of the invention, the product is heated by steam injection in the direct heating step and then cooled without the use of a vacuum chamber.

DETAILED DESCRIPTION OF THE INVENTION

Figure 1:
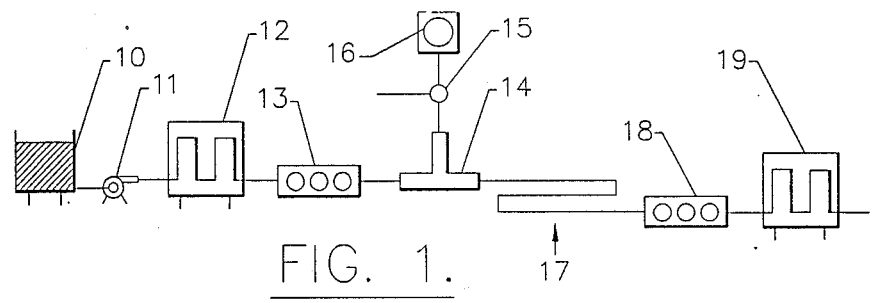
FIG. 1 schematically illustrates a preferred apparatus for carrying out the present invention, which apparatus provides steam injection heating and cooling without a vacuum chamber.

In the initial indirect heating step, the liquid whole egg product is heated by contacting the product to a heated surface. The heated surface should be comprised of a corrosion-resistant, non-toxic and non-absorbent material such as stainless steel. Standards for evaluating the acceptability of such product contact surfaces (the 3-A Sanitary Standards) are known and established. See, e. g., *Egg Pasteurization Manual*, supra, at 27.

In the first indirect heating step, the product is preferably heated to a temperature of at least about 120° F. As explained below, it is preferable to minimize the temperature difference between the first and second heating steps. Hence, in the first indirect heating step the product is more preferably heated to a temperature of at least about 136° F., and most preferably heated to a temperature of at least about 146° F.

To obtain a superior ultrapasteurized liquid whole egg product, the contact time of the liquid egg product to heated surfaces during the indirect heating step is preferably reduced. More particularly, every particle of liquid whole egg product should preferably be in contact with the heated surface or surfaces of the unit in which the indirect heating step is carried out for a total time less than the residence time of the particle in the heating unit. (The term "particle" as used herein has its standard meaning in the egg pasteurization field. See, e. g., 7 C.F.R. §59.570(b) (1985)). This is accomplished by mixing the product at least periodically while it is being heated. In a continuous flow pasteurizing apparatus, such mixing is accomplished by introducing turbulence into the stream of the product at least periodically while it is being heated, as discussed below. Other steps which are preferably employed to reduce fluid element contact time to heated surfaces include providing portions of the thermal treatment in which fluid elements are not in contact with heated surfaces, such as by providing a portion of the thermal treatment in a holding section, and by providing heated contact surface area to product volume ratios of less than 18 $cm^2/cm^3$. (Thus the surface area to volume ratio is preferably less than about 10, and is more preferably in the area of about 2).

It is also desirable to induce physical forces to make the product more homogeneous prior to thermal treatment, such as by inducing shear forces capable of reducing protein and fat unit size therein. This is preferably accomplished by dispersing the product prior to heating. Dispersing may be carried out with a dispersing valve or with a timing pump, as is known in the art. Such treatment advantageously reduces fouling, and serves to reduce any tendency of the product to coagulate. Such a dispersing step may be carried out by conducting a more rigorous homogenization step, but it is recommended that such more expensive homogenizing equipment be used as described below.

It is preferable to mix the liquid egg product at least periodically during the first heating step. As noted above, in continuous flow equipment mixing is carried out by at least periodically subjecting the stream of liquid egg product to turbulence while it is heated. Turbulence, which is the mixing of particles over the cross-section of the product stream, is discussed in the *Egg Pasteurization Manual* at pages 6–8. Such turbulence is characterized by a Reynolds number greater than about 2,300, and preferably greater than about 4,600. Commercial high temperature, short time pasteurizing units are available which at least periodically impart turbulence to the stream of product being pasteurized while the product is being heated. For the purposes of the present invention, greater levels of turbulence during the indirect heating step are preferred. Thus, the liquid egg product is preferably subjected to turbulence for a major portion of the time it is heated. Plate heat exchangers, trombone heat exchangers, spiral heat exchangers, and scrape surface heat exchangers are illustrative of the types of known heat exchangers which can be used to subject liquid egg products to turbulence while they are heated by contact to a heated surface. The physical forces induced in scrape surface heat exchangers are generally thought of as "mixing," but these exchangers induce turbulence at least in regions of the product stream, and are therefore considered to induce turbulence for purposes of the present invention.

In the direct heating step, the product is heated by contacting the product to steam. Preferably, the steam is held at not less than atmospheric pressure while it is contacted to the product. In contrast, Eynon Jones, Sugihara, et al., and Kline et al. all contact the product to steam under a vacuum. The steam contact may be carried out by either steam infusion or steam injection, with steam injection being preferred. When carried out by steam injection, the injected steam pressure should be greater than the backpressure of the continuous product stream, and the backpressure of the continuous product stream should be at least about 10 p.s.i. greater than atmospheric pressure. This insures proper condensation of the injected steam. Preferably, the temperature of the product is raised not more than about 37° F. by the second heating step. More preferably, the temperature is raised not more than about 20° F., and most preferably the temperature is raised not more than about 10° F.

The holding time following the second, direct heating step must be sufficient to cause at least a nine log cycle reduction of Salmonella bacteria in the product. The term "holding time," as used herein, has its ordinary meaning as used in the industry, and all log cycle reductions referred to herein concern the processed product as compared to the raw, unprocessed product. Preferably, the holding time is sufficient to produce a product having a shelf life of at least four weeks under refrigerated conditions. Most preferably the holding time is sufficient to cause a nine log cycle reduction in *Listeria monocytogenes* in the product, as required by the applicable government standards regulating the sale of such products.

By incorporating an appreciable holding time into the process after the steam heating step, the operating problems inherent in Kline et al., Sugihara et al., and Eynon-Jones are reduced. Thus, this holding time is preferably at least ten seconds, and more preferably at least thirty seconds It is preferable that a homogenization step be included after the product has been maintained at the second predetermined temperature. If a vacuum evaporation and cooling step is included, it is preferably positioned between the steam heating step and the homogenization step. The term "homogenize," as used herein, means to subject a product to physical forces to reduce particle size. Such procedures are known in the art, and may be carried out on different types of equipment. It is preferable to carry out this homogenizing step with homogenizing equipment at total pressures of from about 500 p.s.i. to about 3,000 p.s.i.

Examples of liquid whole egg products which can be ultrapasteurized by the method of the present invention include whole egg, fortified whole egg (whole egg with added yolk), salt whole egg (e.g., salt 10%), sugar whole egg (e.g., sugar 10%), blends of whole egg with syrup solids, syrups, dextrose and dextrins and/or gums and thickening agents, blends of whole eggs with less than 1% sugar and/or salt, scrambled egg mixes (for example, a mix of about 51% egg solids, 30% skim milk solids, 15% vegetable oil and 1.5% salt), reduced cholesterol egg products and blends thereof, custard blends, and the like, that is, products containing at least about 10% egg solids. Products which are extremely sensitive to thermal processing and which are particularly suitable for ultrapasteurization by the present invention include, for example, liquid whole egg and blends thereof (less than 2% added non-egg ingredients), fortified whole egg and blends thereof (24–38% egg solids, 2–12% added non-egg ingredients), liquid salt whole egg, liquid sugar whole egg, and other liquid whole egg blends which are 24–38% egg solids and 12% or less of added non-egg ingredients. Terms used herein have their standard meaning in accordance with industry and regulatory usage. See, e.q., 7 C.F.R. §59.570(b) (1985).

To obtain a product with reduced amounts of spoilage micro-organisms, the pasteurizing apparatus should be sterilized before the liquid whole egg product is passed therethrough. Sterilizing is preferably accomplished by passing hot water under pressure through the pasteurizing apparatus, as is known in the art, so that hot water is contacted to those surfaces which contact the product at a temperature and pressure and for a time sufficient to sterilize these surfaces.

In addition, the product, after ultrapasteurization, should be aseptically packaged. Aseptically packaged means packaged to the exclusion of microorganisms other than those carried by the liquid egg product itself. Equipment suitable for aseptically packaging liquid egg products is commercially available. Also useful in carrying out this step is equipment which packages the product to the substantial exclusion of microorganisms, known in the industry as "clean fillers."

An apparatus for carrying out the method of the present invention is shown schematically in FIG. 1. This apparatus comprises a 150 gallon raw product tank 10, a centrifugal pump 11, a Cherry-Burrell Model E Superplate preheater 12, a positive piston pump 13, a Cherry-Burrell UHT I-type steam injection heater 14, a "Little Scotty TM" steam control valve 15, a Honeywell temperature controller/ recorder 16, a holding section 17, a Cherry-Burrell Model HD-6 aseptic homogenizer 18, and a Cherry-Burrell Model 558X8 No-Bac Spiratherm tube-in-shell cooler 19.

Figure 2:
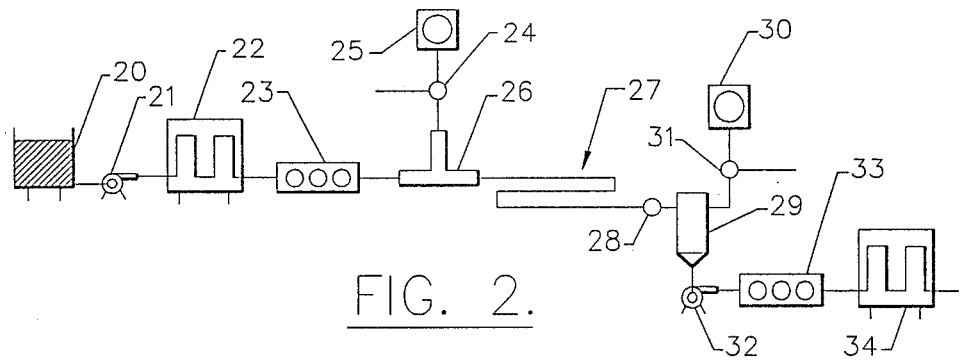
FIG. 2 schematically illustrates an alternate apparatus for carrying out the present invention, which apparatus provides steam injection heating and vacuum cooling.

A second apparatus for carrying out the method of the present invention is shown in FIG. 2. This apparatus comprises a 150-gallon raw product tank including a two-speed agitation device 20, a centrifugal pump 21, a Cherry-Burrell Model "E" Superplate preheater 22, a positive piston pump 23, a "Little Scotty TM" steam control valve 24, a Honeywell temperature controller-recorder 25, a Cherry-Burrell UHT Model "I" steam injector 26, a holding section 27, a backpressure valve 28, a Cherry-Burrell Model "B" No-Bac AroVac vacuum chamber 29, a vacuum controller/recorder 30, a vacuum control valve 31, an aseptic centrifugal pump 32, a Cherry-Burrell Model HD-6 Aseptic Homogenizer 33, and a Cherry-Burrell Model 558X8 No-Bac Spiratherm cooler 34.

Figure 3:
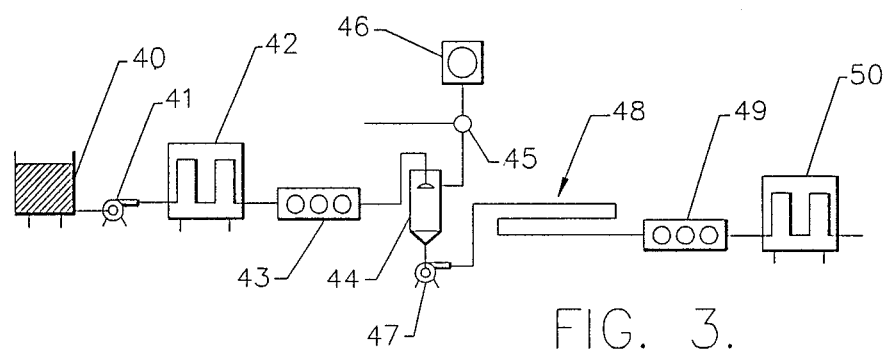
FIG. 3 schematically illustrates another alternate apparatus for carrying out the present invention, which apparatus provides steam infusion heating and cooling without a vacuum chamber.

A third apparatus for carrying out the method of the present invention is schematically illustrated in FIG. 3. This apparatus comprises a 150-gallon raw product tank, including a two-speed agitation device 40, a centrifugal pump 41, a Cherry-Burrell Model "E" Superplate preheater 42, a positive piston pump 43, a steam infusion chamber 44, a "Little Scotty TM" steam control valve 45, a Honeywell temperature controller/-recorder 46, a centrifugal pump 47, a holding section 48, an aseptic homogenizer 49, and a Cherry-Burrell Model EIS Superplate cooler 50.

Figure 4:
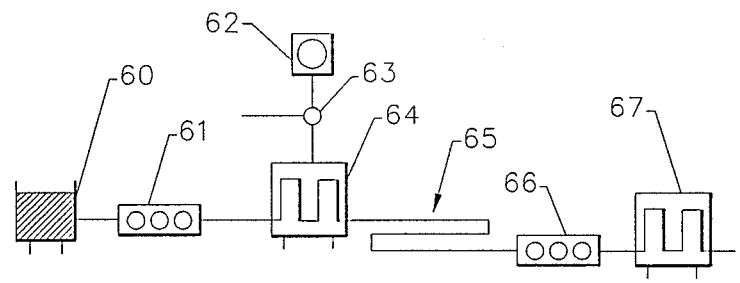
FIG. 4 schematically illustrates a control apparatus which does not provide direct heating.

The apparatus of FIG. 4 is a control apparatus in some of the Examples which follow. This apparatus is comprised of a 150-gallon raw product tank 60, a positive piston pump 61, a Taylor temperature recorder/-controller 62, a steam control valve 63, a Cherry-Burrell Model E Superplate heater 64, a holding section 65, a Cherry-Burrell Model HD-6 aseptic homogenizer 66, and a Cherry-Burrell Model 558X8 No-Bac Spiratherm tube-in-shell cooler 67.

Also disclosed herein is a method of ultrapasteurizing liquid whole egg products in which both the first and second heating steps are direct heating steps. This method is carried out while passing the product as a continuous stream through a pasteurizing apparatus. This method comprises (a) heating the product to a first predetermined temperature by contacting the product to steam; (b) maintaining the product at the first predetermined temperature for a first predetermined holding time; (c) heating the product to a second predetermined temperature by contacting the product to steam; (d) maintaining the product at the second predetermined temperature for a second predetermined holding time sufficient to cause the desired bacterial kill in the product; (e) cooling the product; and then (f) packaging the product to provide a packaged product preferably having a shelf life of at least four weeks under refrigerated conditions. The apparatus is preferably sterilized before passing the product therethrough, the product is preferably packaged aseptically, the bacterial kill is preferably a nine log cycle reduction in *Listeria monocytogenes*, and the product is preferably contacted to steam by steam injection.

Those skilled in the art will appreciate that minor variations can be made in the procedures described herein without departing from the present invention. For example, where reference is made to two heating steps, additional heating steps can be included without departing from this invention.

The following examples are provided to further explain the invention. These examples are provided for illustrative purposes only, and are not to be taken as limiting.

EXAMPLE 1

Raw liquid whole egg was processed in an apparatus of FIG. 2, except that a Pick steam injector was used. The egg was preheated to 120° F., heated by steam injection to 165° F., held at that temperature for 23 seconds, and homogenized at 1,500 p.s.i. The egg was then cooled in a vacuum chamber. The steam line pressure was 100 p.s.i., the steam contact temperature was 270° F., and the holder backpressure was 16 p.s.i.

The functional performance of these samples was investigated with the cake height test and the cream puff test. Both the cake height test and the cream puff test are an indication of the leavening ability of egg proteins: that is, the ability of egg proteins to encapsulate air in a protein film, which film is sufficiently resilient to expand, and which film will coagulate at the appropriate temperature, to thereby set the desired texture of a food product. The cake height test was conducted with sponge cakes. True sponge cakes were made by using half of the amounts of ingredients listed following the procedures given by Gorman and Ball (1986) (Chapter 15 in *Egg Science and Technology*, 3rd Ed., W.J. Stadelman and O.J. Cotterill, Eds., AVI Publishing Col, Inc., Westport, Conn.) with the omission of vanilla. Two separate batches of batter were mixed for each treatment and 340 g of batter was weighed into rectangular pans (21.5×11.5×6.5 cm, id.). Cakes were baked at 191° C. for 25 minutes, inverted on a wire rack and allowed to stand at room temperature overnight. Heights were determined from the mean of four measurements along the center line of the long axis of the cake. Cream puffs were made by mixing oil, water, flour and egg at a standard temperature, transferring the batter to a pastry bag, and then extruding a predetermined quantity of the batter onto a tared sheet of aluminum foil which is then placed in an oven and baked. After baking, the volume of each cream puff was determined by the rape seed displacement method.

The functionality data for egg processed under these conditions, compared to the raw egg as a control, is shown in Table 1 below.

TABLE 1

| Analytical Test | Egg | |
|---|---|---|
| | Raw | Processed |
| Bacterial Plate Count[1] | 5000 | 150 |
| pH | 7.2 | 8.05 |
| Viscosity[2] | 12 | 250 |
| Cake Height[3] | 6.82 | 6.4 |
| Cream Puff Volume[4] | 3.77 | 1.0 |
| Total Solids[5] | 25.4 | 25.2 |

[1] Average, in organisms per gram.
[2] In Centipoise.
[3] In Centimeters.
[4] In Milliliters per gram.
[5] Percent by weight.

The processed egg was noted to have a sulfur odor.

EXAMPLE 2

Raw liquid whole egg was processed in an apparatus of FIG. 2, except that a Pick steam injector was used. The egg was preheated to 120° F., heated by steam injection to 170° F., held at that temperature for 23 seconds, and homogenized at 1,500 p.s.i. The egg was then cooled in a vacuum chamber. The steam line pressure was 100 p.s.i., the steam contact temperature was 280° F., and the holder backpressure was 16 p.s.i. A cake height test and a cream puff volume test was conducted on raw and processed egg in the same manner as described in Example 1 above.

The functionality data for egg processed under these conditions, compared to the raw egg as a control, is shown in Table 2 below.

TABLE 2

| Analytical Test | Egg | |
|---|---|---|
| | Raw | Processed |
| Bacterial Plate Count[1] | 5000 | 70 |
| pH | 7.2 | 8.2 |
| Viscosity[2] | 12 | 4025 |
| Cake Height[3] | 6.82 | 6.1 |
| Cream Puff Volume[4] | 3.77 | 0.7 |
| Total Solids[5] | 25.4 | 25.2 |

[1] Average, in organisms per gram.
[2] In Centipoise.
[3] In Centimeters.
[4] In Milliliters per gram.
[5] Percent by weight.

The processed egg was noted to have a sulfur odor.

EXAMPLE 3

Raw liquid whole egg was processed in an apparatus of FIG. 2, except that a Pick steam injector was used. The egg was preheated to 118° F., heated by steam injection to 157° F., held at that temperature for 40 seconds, and homogenized at 1,500 p.s.i. The egg was then cooled in a vacuum chamber. The steam line pressure was 100 p.s.i., the steam contact temperature was 276° F., and the holder backpressure was 20 p.s.i. A cake height test and a cream puff volume test was conducted on raw and processed egg in the same manner as described in Example 1 above.

The functionality data for egg processed under these conditions, compared to the raw egg as a control, is shown in Table 3 below.

TABLE 3

| Analytical Test | Egg | |
|---|---|---|
| | Raw | Processed |
| Bacterial Plate Count[1] | 2000 | <1 |
| pH | 7.1 | 7.8 |
| Viscosity[2] | 12.5 | 266 |

TABLE 3-continued

| Analytical Test | Egg | |
|---|---|---|
| | Raw | Processed |
| Cake Height[3] | 6.08 | 4.6 |
| Cream Puff Volume[4] | 4.38 | 1.5 |
| Total Solids[5] | 23.5 | 23.4 |

[1]Average, in organisms per gram.
[2]In Centipoise.
[3]In Centimeters.
[4]In Milliliters per gram.
[5]Percent by weight.

The processed egg was noted to have a slight sulfur odor.

EXAMPLE 4

Raw liquid whole egg was processed in an apparatus of FIG. 2, except that a Pick steam injector was again used. The egg was preheated to 118° F., heated by steam injection to 153° F., held at that temperature for 40 seconds, and homogenized at 1,500 p.s.i. The egg was then cooled in a vacuum chamber. The steam line pressure was 100 p.s.i., the steam contact temperature was 275° F., and the holder backpressure was 20 p.s.i. A cake height test and a cream puff volume test was conducted on raw and processed egg in the same manner as described in Example 1 above.

The functionality data for egg processed under these conditions, compared to the raw egg as a control, is shown in Table 4 below.

TABLE 4

| Analytical Test | Egg | |
|---|---|---|
| | Raw | Processed |
| Bacterial Plate Count[1] | 2000 | <1 |
| pH | 7.1 | 7.9 |
| Viscosity[2] | 12.5 | 114 |
| Cake Height[3] | 6.08 | 4.8 |
| Cream Puff Volume[4] | 4.38 | 1.3 |
| Total Solids[5] | 23.5 | 23.1 |

[1]Average, in organisms per gram.
[2]In Centipoise.
[3]In Centimeters.
[4]In Milliliters per gram.
[5]Percent by weight.

The processed egg was noted to have a slight sulfur odor.

EXAMPLE 5

Raw liquid whole egg was processed in an apparatus of FIG. 4. The egg was heated by a plate-type heat exchanger to 149° F.-163° F., held at that temperature for 40 seconds, and homogenized at 3,000 p.s.i. A cake height test and a cream puff volume test was conducted on raw and processed egg in the same manner as described in Example 1 above.

The functionality data for egg processed under these conditions, compared to the raw egg as a control, is shown in Table 5 below.

TABLE 5

| Analytical Test | Egg | |
|---|---|---|
| | Raw | Processed |
| Bacterial Plate Count[1] | 5600 | N/A |
| pH | 7.4 | 7.2 |
| Viscosity[2] | 10.5 | 11 |
| Cake Height[3] | 5.7 | 5.7 |
| Cream Puff Volume[4] | 4.05 | 4.3 |
| Total Solids[5] | 24 | 24 |

[1]Average, in organisms per gram.
[2]In Centipoise.
[3]In Centimeters.
[4]In Milliliters per gram.
[5]Percent by weight.

EXAMPLE 6

Raw liquid whole egg was processed in an apparatus of FIG. 1, except that a Pick steam injector was used. The egg was preheated to 123° F., heated by steam injection to 155° F., held at that temperature for 40 seconds, and homogenized at 3,000 p.s.i. The steam line pressure was 100 p.s.i., the steam contact temperature was 340° F., and the holder backpressure was 60 p.s.i. The egg was then cooled in a plate-type heat exchanger. A cake height test and a cream puff volume test was conducted on raw and processed egg in the same manner as described in Example 1 above.

The functionality data for egg processed under these conditions, compared to the raw egg as a control, is shown in Table 6 below.

TABLE 6

| Analytical Test | Egg | |
|---|---|---|
| | Raw | Processed |
| Bacterial Plate Count[1] | 5600 | N/A |
| pH | 7.4 | 7.2 |
| Viscosity[2] | 10.5 | 23 |
| Cake Height[3] | 5.7 | 4.3 |
| Cream Puff Volume[4] | 4.05 | 1.9 |
| Total Solids[5] | 24 | 23.4 |

[1]Average, in organisms per gram.
[2]In Centipoise.
[3]In Centimeters.
[4]In Milliliters per gram.
[5]Percent by weight.

EXAMPLE 7

Raw liquid whole egg was processed in an apparatus of FIG. 2, except that a Pick steam injector was used. The egg was preheated to 126° F., heated by steam injection to 159° F., held at that temperature for 40 seconds, and homogenized at 3,000 p.s.i. The egg was then cooled in a vacuum chamber. The steam line pressure was 100 p.s.i., the steam contact temperature was 280° F., and the holder backpressure was 20 p.s.i. A cake height test and a cream puff volume test was conducted on raw and processed egg in the same manner as described in Example 1 above.

The functionality data for egg processed under these conditions, compared to the raw egg as a control, is shown in Table 7 below.

TABLE 7

| Analytical Test | Egg | |
|---|---|---|
| | Raw | Processed |
| Bacterial Plate Count[1] | 5600 | N/A |
| pH | 7.4 | 7.9 |
| Viscosity[2] | 10.5 | 144 |
| Cake Height[3] | 5.7 | 5.0 |
| Cream Puff Volume[4] | 4.05 | 1.1 |

TABLE 7-continued

| Analytical Test | Egg | |
| --- | --- | --- |
| | Raw | Processed |
| Total Solids[5] | 24 | 23.6 |

[1] Average, in organisms per gram.
[2] In Centipoise.
[3] In Centimeters.
[4] In Milliliters per gram.
[5] Percent by weight.

EXAMPLE 8

Raw liquid whole egg was processed in an apparatus of FIG. 2, except that a Pick steam injector was used. The egg was preheated to 135° F., heated by steam injection to 154° F., held at that temperature for 40 seconds, and homogenized at 4,500 p.s.i. The egg was then cooled in a vacuum chamber. The steam line pressure was 100 p.s.i., the steam contact temperature was 274° F., and the holder backpressure was 20 p.s.i. A cake height test and a cream puff volume test was conducted on raw and processed egg in the same manner as described in Example 1 above.

The functionality data for egg processed under these conditions, compared to the raw egg as a control, is shown in Table 8 below.

TABLE 8

| Analytical Test | Egg | |
| --- | --- | --- |
| | Raw | Processed |
| Bacterial Plate Count[1] | 5600 | N/A |
| pH | 7.4 | 7.9 |
| Viscosity[2] | 10.5 | 127 |
| Cake Height[3] | 5.7 | 5.1 |
| Cream Puff Volume[4] | 4.05 | 1.1 |
| Total Solids[5] | 24 | 23.7 |

[1] Average, in organisms per gram.
[2] In Centipoise.
[3] In Centimeters.
[4] In Milliliters per gram.
[5] Percent by weight.

EXAMPLE 9

Raw liquid whole egg was processed in an apparatus of FIG. 2, except that a Pick steam injector was used. The egg was preheated to 138° F., homogenized at 3,000 p.s.i., then heated by steam injection to 156° F., held at that temperature for 40 seconds, and homogenized at 3,000 p.s.i. The egg was then cooled in a vacuum chamber. The steam line pressure was 100 p.s.i., the steam contact temperature was 273° F., and the holder backpressure was 20 p.s.i. A cake height test and a cream puff volume test was conducted on raw and processed egg in the same manner as described in Example 1 above.

The functionality data for egg processed under these conditions, compared to the raw egg as a control, is shown in Table 9 below.

TABLE 9

| Analytical Test | Egg | |
| --- | --- | --- |
| | Raw | Processed |
| Bacterial Plate Count[1] | 5600 | N/A |
| pH | 7.4 | 8.1 |
| Viscosity[2] | 10.5 | 268 |
| Cake Height[3] | 5.7 | 5.0 |
| Cream Puff Volume[4] | 4.05 | 1.7 |
| Total Solids[5] | 24 | 23.7 |

[1] Average, in organisms per gram.
[2] In Centipoise.
[3] In Centimeters.
[4] In Milliliters per gram.
[5] Percent by weight.

EXAMPLE 10

Raw liquid whole egg was processed in an apparatus of FIG. 3, except that steam at atmospheric pressure in an infusion chamber was used instead of steam injection. The egg was preheated to 127° F., heated by atmospheric steam to 151° F., held at that temperature for 40 seconds, and homogenized at 3,000 p.s.i. The egg was then cooled in a plate-type heat exchanger. The steam line pressure was 70 p.s.i. A cake height test and a cream puff volume test was conducted on raw and processed egg in the same manner as described in Example 1 above.

The functionality data for egg processed under these conditions, compared to the raw egg as a control, is shown in Table 10 below.

TABLE 10

| Analytical Test | Egg | |
| --- | --- | --- |
| | Raw | Processed |
| Bacterial Plate Count[1] | 5800 | <1 |
| pH | 7.4 | 7.35 |
| Viscosity[2] | 11 | 9.5 |
| Cake Height[3] | 6.1 | 5.9 |
| Cream Puff Volume[4] | 4.6 | 3.0 |
| Total Solids[5] | 24 | 23.3 |

[1] Average, in organisms per gram.
[2] In Centipoise.
[3] In Centimeters.
[4] In Milliliters per gram.
[5] Percent by weight.

EXAMPLE 11

Raw liquid whole egg was process in an apparatus of FIG. 4. The egg was heated by a plate-type heat exchanger to 151° F.–155° F., held at that temperature for 40 seconds, and homogenized at 3,000 p.s.i. The egg was then cooled in a plate-type heat exchanger. A cake height test and a cream puff volume test was conducted on raw and processed egg in the same manner as described in Example 1 above.

The functionality data for egg processed under these conditions, compared to the raw egg as a control, is shown in Table 11 below.

TABLE 11

| Analytical Test | Egg | |
| --- | --- | --- |
| | Raw | Processed |
| Bacterial Plate Count[1] | >65,000,000 | <1 |
| pH | 7.5 | 7.5 |
| Viscosity[2] | 12 | 11.5 |
| Cake Height[3] | 5.7 | 5.1 |
| Cream Puff Volume[4] | 2.85 | 3.1 |
| Total Solids[5] | 22 | 22.1 |

[1] Average, in organisms per gram.
[2] In Centipoise.
[3] In Centimeters.
[4] In Milliliters per gram.
[5] Percent by weight.

EXAMPLE 12

Raw liquid whole egg was processed in an apparatus of FIG. 3, except that steam at atmospheric pressure in a steam infusion chamber was used instead of steam injection. The egg was preheated to 133° F., heated by steam infusion to 142° F.–153° F., held at that temperature for 40 seconds, and homogenized at 3,000 p.s.i. The steam line pressure was 70 p.s.i., and the steam contact temperature was 233° F. The egg was then cooled in a plate-type heat exchanger. A cake height test and a cream puff volume test was conducted on raw and processed egg in the same manner as described in Example 1 above.

The functionality data for egg processed under these conditions, compared to the raw egg as a control, is shown in Table 12 below.

TABLE 12

| Analytical Test | Egg | |
|---|---|---|
| | Raw | Processed |
| Bacterial Plate Count[1] | >65,000,000 | 240 |
| pH | 7.5 | 7.55 |
| Viscosity[2] | 12 | 18 |
| Cake Height[3] | 5.7 | 5.1 |
| Cream Puff Volume[4] | 2.85 | 2.9 |
| Total Solids[5] | 22 | 22.2 |

[1]Average, in organisms per gram.
[2]In Centipoise.
[3]In Centimeters.
[4]In Milliliters per gram.
[5]Percent by weight.

EXAMPLE b 13

Raw liquid whole egg was processed in an apparatus of FIG. 3, except that steam under vacuum in a steam infusion chamber was used instead of steam injection. The egg was preheated to 128° F., heated by steam to 145.5° F., held at that temperature for approximately 40 seconds, and homogenized at 3,000 p.s.i. The product was then cooled in a vacuum chamber. The steam line pressure was 70 p.s.i., and the steam contact temperature was 190° F. A cake height test and a cream puff volume test was conducted on raw and processed egg in the same manner as described in Example 1 above.

The functionality data for egg processed under these conditions, compared to the raw egg as a control, is shown in Table 13 below.

TABLE 13

| Analytical Test | Egg | |
|---|---|---|
| | Raw | Processed |
| Bacterial Plate Count[1] | >65,000,000 | 180 |
| pH | 7.5 | 7.5 |
| Viscosity[2] | 12 | 6 |
| Cake Height[3] | 5.7 | 4.3 |
| Cream Puff Volume[4] | 2.85 | 3.1 |
| Total Solids[5] | 22 | 22.4 |

[1]Average, in organisms per gram.
[2]In Centipoise.
[3]In Centimeters.
[4]In Milliliters per gram.
[5]Percent by weight.

EXAMPLE 14

Raw liquid whole egg was processed in an apparatus of FIG. 2, except that a Pick steam injector was used. The egg was preheated to 147° F., heated by steam injection to 154° F.–156° F., held at that temperature for 40 seconds, and homogenized at 3,000 p.s.i. The product was then cooled in a vacuum chamber. The steam line pressure was 70 p.s.i., the steam contact temperature was 262° F., and the holder backpressure was 15 p.s.i. A cake height test and a cream puff volume test was conducted on raw and processed egg in the same manner as described in Example 1 above.

The functionality data for egg processed under these conditions, compared to the raw egg as a control, is shown in Table 14 below.

TABLE 14

| Analytical Test | Egg | |
|---|---|---|
| | Raw | Processed |
| Bacterial Plate Count[1] | 79,000 | <1 |
| pH | 7.5 | 8.0 |
| Viscosity[2] | 11 | 16.5 |
| Cake Height[3] | 6 | 5.2 |
| Cream Puff Volume[4] | 3.1 | 1.4 |
| Total Solids[5] | 22.5 | 22.3 |

[1]Average, in organisms per gram.
[2]In Centipoise.
[3]In Centimeters.
[4]In Milliliters per gram.
[5]Percent by weight.

EXAMPLE 15

Raw liquid whole egg was processed in an apparatus of FIG. 1. The egg was preheated to 147° F., heated by steam injection to 156° F.–157° F., held at that temperature for 40 seconds, and homogenized at 1,000 p.s.i. The product was then cooled in a tube-in-shell heat exchanger. The steam line pressure was 55 p.s.i., the steam contact temperature was from 245° to 275° F., and the holder backpressure was from 25 p.s.i. to 45 p.s.i. A cake height test and a cream puff volume test was conducted on raw and processed egg in the same manner as described in Example 1 above.

The functionality data for egg processed under these conditions, compared to the raw egg as a control, is shown in Table 15 below.

TABLE 15

| Analytical Test | Egg | |
|---|---|---|
| | Raw | Processed |
| Bacterial Plate Count[1] | 10,000 | 50 |
| pH | 7.5 | 7.4 |
| Viscosity[2] | 11 | 20 |
| Cake Height[3] | 5.9 | 5.5 |
| Cream Puff Volume[4] | 3.7 | 2.1 |
| Total Solids[5] | 24.1 | 23.7 |

[1]Average, in organisms per gram.
[2]In Centipoise.
[3]In Centimeters.
[4]In Milliliters per gram.
[5]Percent by weight.

EXAMPLE 16

Raw liquid whole egg was processed in an apparatus of FIG. 2. The egg was preheated to 147° F., heated by steam injection to 156° F.–158° F., held at that temperature for 40 seconds, and homogenized at 1,000 p.s.i. The egg product was then cooled in a vacuum chamber. The steam line pressure was 55 p.s.i., the steam contact temperature was from 250° F. to 267° F., and the holder backpressure was 25 p.s.i. to 30 p.s.i. A cake height test and a cream puff volume test was conducted on raw and processed egg in the same manner as described in Example 1 above.

The functionality data for egg processed under these conditions, compared to the raw egg as a control, is shown in Table 16 below.

TABLE 16

| Analytical Test | Egg Raw | Egg Processed |
|---|---|---|
| Bacterial Plate Count[1] | 10,000 | 100 |
| pH | 7.5 | 7.7 |
| Viscosity[2] | 11 | 20 |
| Cake Height[3] | 5.9 | 5.7 |
| Cream Puff Volume[4] | 3.7 | 1.7 |
| Total Solids[5] | 24.1 | 23.8 |

[1] Average, in organisms per gram.
[2] In Centipoise.
[3] In Centimeters.
[4] In Milliliters per gram.
[5] Percent by weight.

EXAMPLE 17

Raw liquid whole egg was processed in an apparatus of FIG. 4. The egg was preheated to 119° F., heated by a tube-in-shell heat exchanger to 154° F., held at that temperature for 114 seconds, and homogenized at 1,500 p.s.i. The egg product was then cooled in a tube-in-shell heat exchanger. The holder backpressure was 1,650 p.s.i. A cake height test and a cream puff volume test was conducted on raw and processed egg in the same manner as described in Example 1 above.

The functionality data for egg processed under these conditions, compared to the raw egg as a control, is shown in Table 17 below.

TABLE 17

| Analytical Test | Egg Raw | Egg Processed |
|---|---|---|
| Bacterial Plate Count[1] | 180,000 | 50 |
| pH | 7.35 | 7.35 |
| Viscosity[2] | 9.0 | 11 |
| Cake Height[3] | 6.6 | 6.6 |
| Cream Puff Volume[4] | 3.6 | 2.8 |
| Total Solids[5] | 24.3 | 24.4 |

[1] Average, in organisms per gram.
[2] In Centipoise.
[3] In Centimeters.
[4] In Milliliters per gram.
[5] Percent by weight.

EXAMPLE 18

Raw liquid whole egg was processed in an apparatus of FIG. 1. The egg was preheated to 146° F., heated by steam injection to 157° F.–158° F., held at that temperature for 40 seconds, and homogenized at 1,500 p.s.i. The egg was then cooled in a tube-in-shell heat exchanger. The steam line pressure was 60 p.s.i., the steam contact temperature was from 250° F. to 260° F., and the holder backpressure was 20 p.s.i. A cake height test and a cream puff volume test was conducted on raw and processed egg in the same manner as described in Example 1 above.

The functionality data for egg processed under these conditions, compared to the raw egg as a control, is shown in Table 18 below.

TABLE 18

| Analytical Test | Egg Raw | Egg Processed |
|---|---|---|
| Bacterial Plate Count[1] | 180,000 | <1 |
| pH | 7.35 | 7.75 |
| Viscosity[2] | 9.0 | 16 |
| Cake Height[3] | 6.6 | 6.2 |
| Cream Puff Volume[4] | 3.6 | 1.7 |
| Total Solids[5] | 24.3 | 23.9 |

[1] Average, in organisms per gram.
[2] In Centipoise.
[3] In Centimeters.
[4] In Milliliters per gram.
[5] Percent by weight.

EXAMPLE 19

This Example was conducted to demonstrate the improved run times provided by the present invention over methods employing indirect heat alone.

A direct heating run and an indirect heating run were conducted, with the runs designed to produce analogous products. Processing equipment and target parameters for these runs are given in Table 19 below, operating conditions are given in Table 20 below, and analytical results are given in Table 21 below.

TABLE 19

| Process Equipment and Target Parameters | |
|---|---|
| Direct | Indirect |
| Plate preheat, 146° F. | Plate preheat, 120° F. |
| Steam injection final heat, 157° F. | Tube-in-shell final heat, 154° F. |
| Mean hold time, 40 sec | Mean hold time, 114 sec |
| Mean hold tube vel., 2.3 ft/sec | Mean hold tube vel., 8.9 ft/sec |
| Volumetric flow rate, 275 GPH | Volumetric flow rate, 275 GPH |
| Homogenization p.s.i., 1500 | Homegenizaiton p.s.i., 1500 |
| Tube-in-shell cooling, 40° F. | Tube-in-shell cooling, 40° F. |

TABLE 20

| Operating Conditions | Direct | Indirect |
|---|---|---|
| Preheat temperature, °F. | 147–145 | 118–120 |
| Heating media temperature, °F. | 248–262 (steam) | 170–193 (hot water) |
| Hold tube pressure, p.s.i. | 10–20 | 1,100–1,650 |
| Final process temperature, °F. | 159–160.5 | 150–152 |
| Mean hold time, sec | 40 | 114 |
| Equivalent process temperature,* °F. | 155.5 | 151.8 |
| Equivalent hold time,* sec | 51.8 | 117.0 |

*The equivalent times and temperatures are based on previous shelf-life kinetics for 20 weeks.

TABLE 21

| Analytical Test | Egg Raw | Egg Direct | Egg Indirect |
|---|---|---|---|
| Microbial inactivation (log reduction) | — | 5.25 | 3.50 |
| pH | 7.35 | 7.75 | 7.35 |
| Viscosity (cp) | 9.0 | 16.0 | 11.0 |
| Total Solids (% wb) | 24.3 | 23.9 | 24.4 |
| Functionality, cakes (% volume reduction) | — | 5.5 | 0.0 |
| Functionality, cream puffs (% volume reduction) | — | 52.0 | 22.0 |
| Flavor (scale 0–8) | 8.0 | 7.4 | 7.4 |

Figure 5:
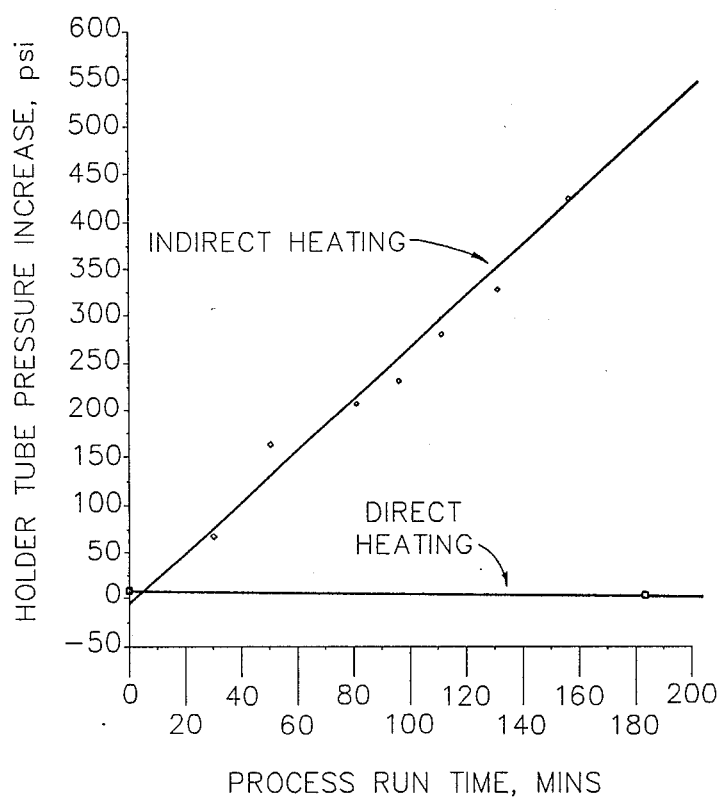
FIG. 5, presenting data generated in Example 19, demonstrates the improved run times provided by the present invention.

To demonstrate how the present invention provides improved run times, the pressure profiles in the holding section was measured during each of these runs. These data are given in FIG. 5. Pressure profile is an indication of fouling, with fouling being the primary limitation on run time. FIG. 5 illustrates the increase in pressure over time with the indirect heating method, as compared to the stable pressure over time with the direct heating method.

EXAMPLE 20

This Example was conducted to demonstrate the viscosity control provided by the present invention.

Raw liquid whole egg was processed in an apparatus consisting of three systems of FIG. 1 assembled in series. The egg was preheated to 147° F., heated by steam injection to 154° F.–157° F., held for 3.8 seconds, cooled to 54° F and homogenized at 500 p.s.i.. A second preheating step heated the product to 136° F.–147° F., while the second injector heated the product to 157° F.–158° F. The egg was held for 3.8 seconds, cooled to 53° F.–85° F., and homogenized at 500 p.s.i. A third preheating step elevated the egg temperature to 127° F.–135° F., while the third injector heated the product to 156° F.–158° F. The egg was held for 3.8 seconds, cooled to 86° F.–90° F., and homogenized at 500 p.s.i. The steam line pressure for all injectors was 60 p.s.i., the steam contact temperature was from 271° F. to 286° F. for the first injector, from 298° F. to 305° F. for the second injector, and from 291° F. to 298° F. for the third injector. The holder backpressure was 17 p.s.i. for the first, 26 p.s.i. for the second, and 40 p.s.i. for the third. A cream puff volume test was conducted on raw and processed egg in the same manner as described in Example 1 above.

The functionality data for egg processed under these conditions compared to raw egg as a control is shown in Table 22.

TABLE 22

| | | Egg | | |
|---|---|---|---|---|
| Analytical Test | Raw | First Injection | Second Injection | Third Injection |
| Bacterial Plate Count[1] | <10,000 | <10 | <10 | <10 |
| pH | 7.41 | 7.54 | 7.58 | 7.77 |
| Viscosity[2] | 10 | 16 | 41 | ~600 |
| Cream Puff Volume[3] | 3.4 | 2.6 | 1.1 | 0.80 |
| Total Solids[4] | 24.4 | 24.0 | 23.5 | 22.75 |

[1]Average, in organisms per gram.
[2]In Centipoise.
[3]In Milliliters per gram.
[4]Percent by weight.

Figure 6:
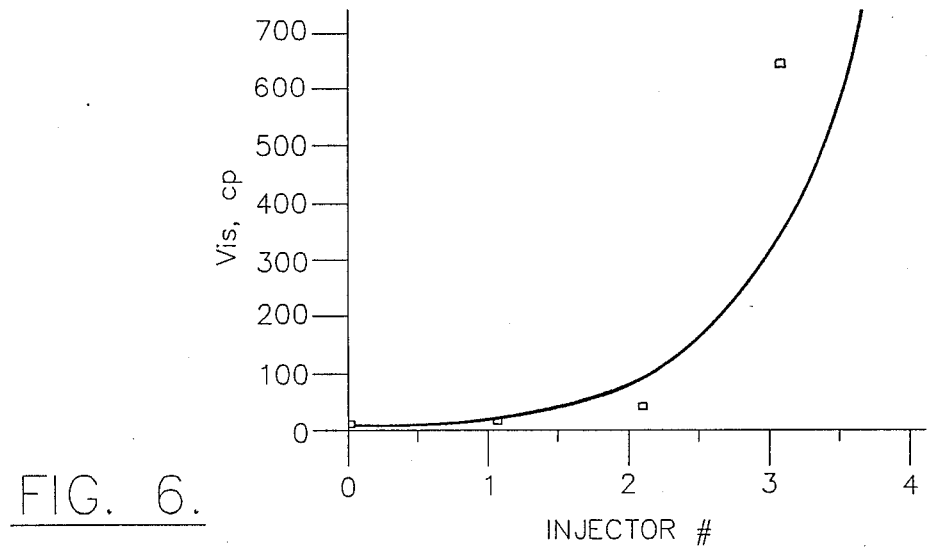
FIG. 6, presenting data generated in Example 20, demonstrates the superior viscosity control provided by the present invention.

Viscosity data is presented graphically in FIG. 6. These data illustrate the product viscosity control provided by direct heating.

The foregoing examples are illustrative of the present invention, and are not to be taken as limiting thereof. The invention is defined by the following claims, with equivalents of the claims to be included therein.

That which is claimed is:

1. A method of ultrapasteurizing a liquid whole egg product while passing the product as a continuous stream through a pasteurizing apparatus, comprising:
   (a) heating the product to a first predetermined temperature; then
   (b) maintaining the product at said first predetermined temperature for a first predetermined holding time; then
   (c) heating the product to a second predetermined temperature by contacting the product to steam,; then
   (d) maintaining the product at said second predetermined temperature for a second predetermined holding time sufficient to cause a nine log cycle reduction of *Listeria monocytogenes* in said product; then
   (e) cooling said product; and then
   (f) aseptically packaging said product, wherein the product is maintained at not less than atmospheric pressure from the time the product is heated to said second predetermined temperature to the time the product is packaged.

2. A method according to claim 1, wherein said steam is at not less than atmospheric pressure.

3. A method according to claim 1, wherein said temperature of said product is raised by not more than about 37° F. when said product is heated to said second predetermined temperature.

4. A method according to claim 1, wherein said product is heated to a temperature of at least about 120° F. when said product is heated to said first predetermined temperature.

5. A method according to claim 1, wherein said product is heated to said first predetermined temperature by contacting said product to a heated surface.

6. A method according to claim 1, further comprising the step of homogenizing the product after said step of maintaining the product at said second predetermined temperature.

7. A method according to claim 1, further comprising the step of sterilizing said pasteurizing apparatus before passing said product therethrough.

8. A method of ultrapasteurizing a liquid whole egg product while passing the product as a continuous stream through a pasteurizing apparatus, comprising:
   (a) heating the product to a first predetermined temperature; then
   (b) maintaining the product at said first predetermined temperature for a first predetermined holding time; then
   (c) heating the product to a second predetermined temperature by injecting steam under pressure into said continuous stream, wherein the injected steam pressure is greater than the backpressure of said continuous stream, and wherein the backpressure of the continuous stream is at least about 10 p.s.i. greater than atmospheric pressure; then
   (d) maintaining the product at said second predetermined temperature for a time sufficient to cause a nine log cycle reduction of *Listeria monocytogenes* in said product; then
   (e) cooling said product; and
   (f) aseptically packaging said product.

9. A method according to claim 8, wherein said cooling step is a vacuum cooling step.

10. A method according to claim 8, wherein the temperature of said product is raised by not more than about 37° F. when said product is heated to said second predetermined temperature.

11. A method according to claim 8, wherein said product is heated to a temperature of at least about 120° F. when said product is heated to said first predetermined temperature.

12. A method according to claim 8, wherein said product is heated to said first predetermined temperature by contacting said product to a heated surface.

13. A method according to claim 8, further comprising the step of homogenizing the product after said step of maintaining the product at said second predetermined temperature.

14. A method according to claim 8, further comprising the step of sterilizing said pasteurizing apparatus before passing said product therethrough.

15. A method of ultrapasteurizing a liquid whole egg product while passing the product as a continuous stream through a pasteurizing apparatus, comprising:
    (a) heating the product to a first predetermined temperature of at least about 136° F.; then
    (b) maintaining the product at said first predetermined temperature for a first predetermined holding time; then
    (c) heating the product by not more than about 20° F. to a second predetermined temperature by contacting the product to steam; then
    (d) maintaining the product at said second predetermined temperature for a time sufficient to cause a nine log cycle reduction of *Listeria monocytogenes* in said product; then
    (e) cooling said product; and then
    (f) aseptically packaging said product, wherein the product is maintained at not less than atmospheric pressure from the time the product is heated to said second predetermined temperature to the time the product is packaged.

16. A method according to claim 15, wherein said product is heated to said first predetermined temperature by contacting said product to a heated surface.

17. A method according to claim 15, further comprising the step of homogenizing the product after said step of maintaining the product at said second predetermined temperature.

18. A method according to claim 15, further comprising the step of sterilizing said pasteurizing apparatus before passing said product therethrough.

* * * * *